UNITED STATES PATENT OFFICE.

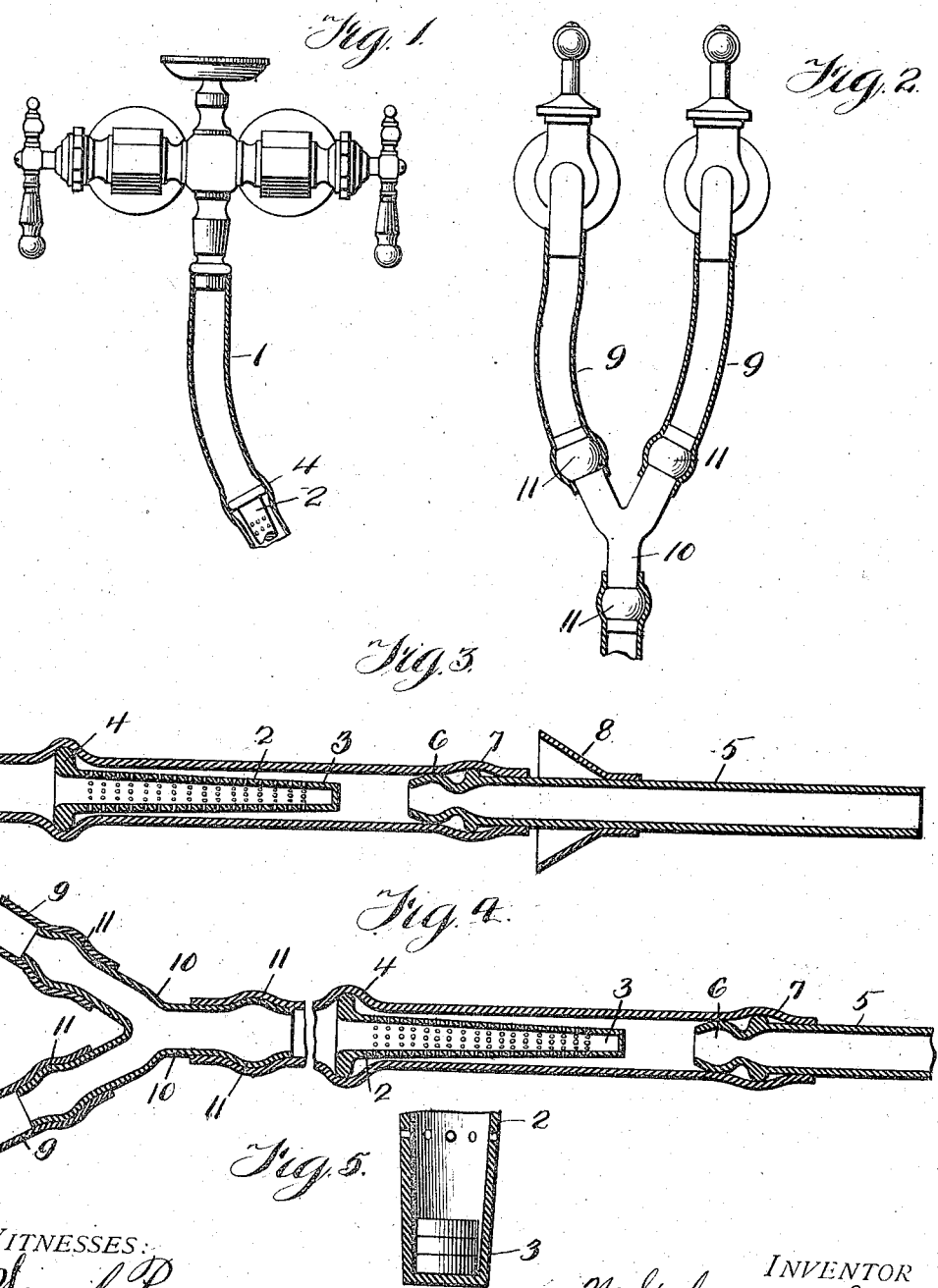

WESLEY G. CRONKRIGHT, OF PITTSBURG, PENNSYLVANIA.

VAGINAL SYRINGE.

No. 867,247.

Specification of Letters Patent.

Patented Oct. 1, 1907.

Application filed December 19, 1906. Serial No. 348,565.

*To all whom it may concern:*

Be it known that I, WESLEY G. CRONKRIGHT, a citizen of the United States of America, residing at Pittsburg, in the county of Allegheny and State of Pennsylvania, have invented certain new and useful Improvements in Vaginal Syringes, of which the following is a specification, reference being had therein to the accompanying drawing.

This invention relates to vaginal syringes, and its object is to provide a device of this character of simple and inexpensive construction, which may be readily taken apart and cleansed.

The construction of the improvement will be fully described hereinafter in connection with the accompanying drawing which forms part of this specification, and its novel features will be defined in the appended claims.

In the drawing, Figure 1 is a fragmentary sectional view of the syringe applied to a faucet, Fig. 2 is a similar view of a modified construction, Fig. 3 is a central longitudinal section of the syringe, Fig. 4 is a similar view of a modification, and Fig. 5 is a sectional view on an enlarged scale of the lower end of the perforated medicament holder.

In the embodiment of the invention shown in Figs. 1 and 3, the reference numeral 1 designates a rubber hose adapted to be attached to the faucet of a bath-tub through which both hot and cold water are discharged. Into this hose is inserted a medicament holder comprising a tube 2 closed at its lower end and open at its upper end and provided with perforations as shown. The imperforate lower end 3 of the tube 2 serves as a chamber or receptacle for antiseptic tablets as illustrated in Fig. 5.

The upper end of the tube 2 is formed with an annular rib or collar 4 which serves to retain the tube within the hose. Within the lower end of the hose 1 is inserted a tube 5 of hard rubber, provided with a head 6 and an annular flange 7, which serve to retain the tube within the lower end of the hose 1.

Upon the tube 5 is arranged a funnel-shaped guard 8, adapted to be adjusted upon the tube.

Figs. 2 and 4 show a modification of the invention in which two hoses 9 are employed in connection with the hose 1. With these two hose connections, I employ a branched or Y-shaped connection 10, formed with globular heads 11, and serving to connect the hoses 9 with the hose 1. This modified construction is adapted for attachment to the hot and cold water faucets of a stationary wash-stand.

The utility of the improvement will be readily understood.

The rigid tube 5 is adapted to be inserted, and the guard 8 serves as a convenient hand-piece in addition to its function as a guard.

What I claim and desire to secure by Letters Patent, is:—

1. A syringe comprising a hose, a perforated tube therein open at one end and closed at its opposite end, a rigid tube attached to said hose, and a guard on said rigid tube.

2. A syringe comprising a hose, a perforated tube therein provided with an annular rib to retain it within the hose, a rigid tube detachably connected to said hose.

3. A syringe comprising a hose, means for attaching said hose to a faucet, a perforated tube within said hose open at one end and closed at the opposite end, a rigid tube attached to the hose, and a funnel-shaped guard on said rigid tube.

4. A syringe comprising a flexible hose, a medicament holder removably mounted within said flexible hose, a rigid tube connected to one end of said hose.

In testimony whereof I affix my signature in the presence of two witnesses.

WESLEY G. CRONKRIGHT.

Witnesses:
 H. C. EVERT,
 MAX H. SROLOVITZ.